United States Patent [19]

Liu et al.

[11] 4,107,259

[45] Aug. 15, 1978

[54] METHOD OF MAKING A CROSS LINKED PILE PRODUCT

[75] Inventors: William Chang Liu, Northbrook, Ill.; Francis H. Bratton, deceased, late of Wilmette, Ill., by Jean C. Bratton, executrix; Robert Ronald Nali, Mundelein, Ill.

[73] Assignee: Brunswick Corporation, Skokie, Ill.

[21] Appl. No.: 732,935

[22] Filed: Oct. 15, 1976

Related U.S. Application Data

[62] Division of Ser. No. 531,183, Dec. 9, 1974.

[51] Int. Cl.² .......................... B29C 5/00; B29C 7/00; B29G 7/00
[52] U.S. Cl. .................................... 264/331; 264/243; 264/328; 264/334
[58] Field of Search ..................... 428/92; 264/243, 22, 264/25, 328, 329, 334, 331; 526/57, 14

[56] References Cited

U.S. PATENT DOCUMENTS

| 3,218,373 | 11/1965 | Salyer | 526/57 |
| 3,235,438 | 2/1966 | Wisotsky | 428/92 |
| 3,372,139 | 3/1968 | Behr et al. | 526/57 |

FOREIGN PATENT DOCUMENTS 241,683  11/1960  Australia .................................. 264/243

Primary Examiner—Willard E. Hoag
Attorney, Agent, or Firm—J. G. Heimovics; D. S. Guttman

[57] ABSTRACT

A method of making a pile product comprising a plurality of relatively long, thin face fibers extending from a base by molding a crosslinkable polymeric material. During the formation of the fibers, crosslinking of the polymeric material is initiated by heat activating a substance incorporated in the polymeric material which promotes crosslinking. Crosslinking imparts hot strength to the pile fibers so that the pile product, while still hot, can be removed from the mold without materially deforming the fibers. Consequently, the time it takes to mold the pile product is significantly reduced, thereby increasing productivity and lowering the cost of the product. Moreover energy is conserved because the mold is not continuously cycled between high and low extremes in temperature.

8 Claims, 8 Drawing Figures

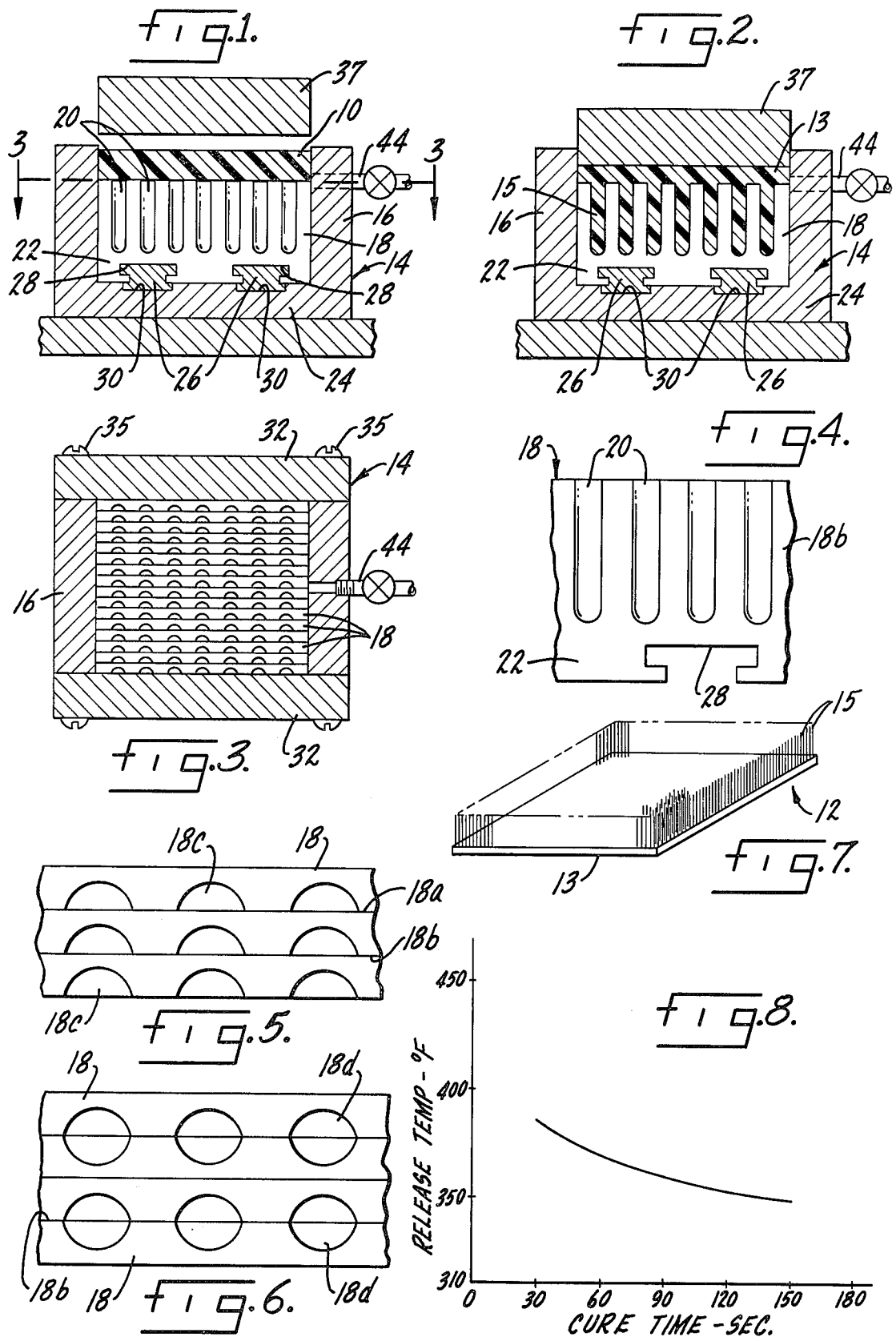

METHOD OF MAKING A CROSS LINKED PILE PRODUCT

CROSS-REFERENCE TO RELATED APPLICATION

This application is a division of prior copending application Ser. No. 531,183 filed Dec. 9, 1974.

BACKGROUND OF THE INVENTION

For many years pile products have been used, for example, in outer garments, shoes, carpets and wall coverings. In the carpet industry, conventional commercial processes for manufacturing such pile products call for tufting yarns through a suitable backing material such as woven polypropylene or jute yarns. One way to simplify the manufacture of pile products is to mold such products directly from thermoplastics. In such molding processes, a thermoplastic polymer is heated to its softening point and forced into a mold having cavities corresponding to the pile fibers. Examples of typical prior art molding processes are described in U.S. Pat. Nos. 3,027,595; 3,141,051; 3,317,644; 3,517,094; 3,632,842; 3,533,895; and 3,804,617.

In general, known molding processes required that the mold be cooled after the formation of the pile products so that the polymer solidifies sufficiently to permit the pile product to be removed from the mold. Such molding processes are acceptable provided the fibers have a configuration which lends itself to easy removal from the mold. Short, relatively thick fibers can be readily removed from the mold, but as the fiber length increases and the fiber diameter decreases, it becomes more difficult to remove such long thin fibers from the mold without severely damaging or deforming the fibers. Frequently, such long, thin fibers are pulled from the backing during removal from the mold to produce bare patches in the pile material, or they yield and stretch to produce areas where the pile fibers are severely elongated.

THE INVENTION

A novel method for making molded pile products has been discovered and employed to make a new molded pile product. The central feature of the method is employing a crosslinkable polymeric material to make pile products and initiating crosslinking of the polymeric material during the formation of the pile fibers. Any resinous material that may be molded and crosslinked would be a suitable polymeric material. Polymers, copolymers or mixtures thereof may be used. Generally, suitable polymers and copolymers would have a molecular weight of about 500 or greater and be formed by addition or condensation polymerization reactions. Crosslinking of such polymeric materials would entail the formation of a chemical bond between macromolecules through, for example, addition, substitution, condensation, or rearrangement reactions. Initiator systems for promoting such crosslinking may involve free radical sources, ionic species, or abstraction of molecular components from the macromolecules. Suitable techniques to achieve crosslinking are disclosed in U.S. Pat. Nos. 2,826,570; 2,849,028; 2,919,474; 3,036,981; and 3,242,159.

In the novel method, the polymeric material preferably is first compressed into a thin sheet or preform incorporating a heat responsive substance which, upon being heated, promotes crosslinking of individual molecules of the polymeric material. The preform is placed in a hot mold including a plurality of cavities corresponding to the pile fibers. The surface of the preform in contact with the hot mold immediately begins to soften and the heat initiates cross-linking of the polymeric material. Simultaneously, the preform is subjected to a uniform pressure to force the softened polymeric material into the cavities of the mold. Because of crosslinking, the molten polymeric material in the cavities gradually transforms into a gel and then into a solid which has hot strength. This transformation occurs without a significant drop in the temperature of the mold, (normally, mold temperature drops only about 5° – 10° C).

Molding Composition

The most preferred molding composition used to make the molded pile product of the invention includes the following proportions of ingredients:

|  | Weight Percent % |
|---|---|
| Polymeric material | 10–99 |
| Crosslinking promoters | 0.5–5 |
| Monomers | 0–70 |
| Additives | 0–70 |

Polymeric Material: A wide variety of starting polymeric materials may be used provided that they are crosslinkable. The preferred physical and chemical properties of such starting polymeric materials are as follows:

| PROPERTY | PREFERRED RANGE |
|---|---|
| Softening Point (° C) | 40–180 |
| Melt Index (grams/10 min.) | .5–100 |
| Specific gravity | 0.9–1.5 |

Generally, suitable starting polymeric materials are polymers, copolymers or mixtures thereof derived from polymerizable organic compounds such as olefin hydrocarbons, vinyl compounds, diene compounds, esters, and urethanes. Examples of suitable olefinic polymeric materials are polymers and copolymers of ethylene, propylene, methylpentene and/or butylene. Examples of suitable vinyl polymeric materials are polymers and copolymers of vinyl acetate, vinyl chloride, styrene, ethylacrylate, diethylfumarate methylmethacrylate and/or butylacrylate. Examples of suitable diene polymeric materials are polymers and copolymers of butadiene, isoprene, and chloroprene. Examples of suitable ester type polymeric materials are the polymers and copolymers of glycol or glycolether phthalates, maleates, fumarates, itaconates, succinates, adipates and/or sebacates. Examples of suitable urethane polymeric materials are polymers made by the reaction of aliphatic and aromatic diisocyanates with polyhydric esters and ethers. The olefinic polymers and copolymers may be halogenated or halogen sulfonated to improve their resistance to solvents and burning.

Ethylene vinyl acetate copolymer is the major component of the most preferred polymeric material. Usually the preferred polymeric material will contain from about 15 to about 99 weight percent ethylene vinyl acetate copolymer. The percent vinyl acetate of such copolymer normally ranges between 5 to 45 percent. Typically, the most preferred ethylene vinyl acetate copolymer has a vinyl acetate content of 33 percent, a melt index of 25, a tensile strength of 98.4 kilograms/cm$^2$ (1400 p.s.i.), a percentage elongation of 900, and a stiffness of 70.3 kilograms/cm$^2$ (1000 p.s.i.), and a Shore hardness of A65.

Crosslinking Promoters: Examples of substances which promote crosslinking are (a) peroxide compounds, with or without added accelerators, (b) mixtures of peroxide compounds, silicon compounds and suitable catalysts, (c) azo compounds, or (d) a mixture of zinc oxide and sulfur. Many of the above substances generated free radicals which promote crosslinking; however, substances which promote crosslinking by addition or condensation reactions could also be used. The above crosslinking promoters may also be blended with monomers and then mixed with polymeric material prior to molding.

The preferred substances used to promote crosslinking are the peroxide and azo compounds. The peroxides may be blended with the polymeric material prior to molding, or mixed with monomers and then incorporated into the polymeric material prior to molding. When the peroxides or azo compounds are blended with the polymeric material, the temperature is controlled so that, during blending, it is below the temperature at which decomposition of the promoter is significant.

The preferred peroxide compounds are benzoyl peroxide, dicumyl peroxide, 2.5 bis(tertiary butyl peroxy)2, 5 dimethyl hexane, $\alpha,\alpha'$-bis(tertiary butyl peroxy) diisopropylbenzene di(tertiary)butyl-diperphthalate, and tertiary butyl perbenzoate. The preferred accelerators are cobalt naphthenate, lead naphthenate, dimethyl aniline.

The preferred silicon compounds are vinyl triethoxy silane and vinyl trimethoxy silane. The preferred catalyst to be used with the silicon compounds is dibutyl tin dilaurate.

The preferred azo compounds are azo bis diisobutyronitrile, and 2 tertiary butyl azo dimethoxy - 4 - methyl pentane.

Monomers: Polymerizable monomers may be used in conjunction with peroxide compounds and polymeric materials. Such monomer will polymerize during formation of the fibers and promote crosslinking. The preferred monomers are: trimethylol propane trimethacrylate, ethylene glycol dimethacrylate, polyethylene glycol dimethacrylates, triallyl cyanurate, triallyl phosphate, and diallylphthalate.

Additives: Preferably the starting polymeric material is mixed with fillers such as silica, carbon black, talc, clay, etc., to improve properties and reduce cost. Antioxidants, dyes and pigments, ultra-violet absorbers and stabilizers, anti-fungal and anti-bacterial agents, and mold release agents may also be added. Hereafter when the term "preferred additives" is used in this application, one or more materials from the group of additives disclosed in this paragraph is intended.

Characteristics of Pile Product and Method of Making Such Product

Broadly, the pile product can be viewed as a base having a given surface area with protuberances extending from the surface of the base. These protuberances have a total surface area which is several times greater than the surface area of the base. The larger the differential between the surface area of the base and the surface area of protuberances, the more difficult it becomes to remove the pile material from the mold. Because of this problem, conventional techniques require cooling the entire mold to a temperature significantly lower than the molding temperature before the molded piece can be removed.

In accordance with the invention, the molded product is removed from the mold without substantially reducing the temperature of the mold. In other words, the temperature at which the molded polymeric material is removed from the mold is about equal or slightly lower than the temperature at which the polymeric material is forced into the mold. Apparently, crosslinking during formation of the pile fibers greatly improves the hot strength of the molded pile product, permitting it to be removed from the mold while still hot. In view of the large number of cavities making up of the mold and the relatively small diameter of these cavities, the inventors were highly reluctant to use crosslinkable materials because if the mold became plugged, it would be very difficult to clean the mold. Surprisingly, plugging of the mold does not occur if care is exercised. Apparently, during crosslinking, gases seem to be generated in situ due to crosslinking to form a barrier between the internal surface of the mold cavities and the surface of the fiber being formed in the mold. This barrier, it is believed, prevents the molded fibers from adhering to the cavity walls and also creates an internal pressure which tends to push against the fibers, forcing them from the mold cavities.

The conditions for making the new pile product will vary in accordance with the starting materials used and the geometric configurations of the pile formed during molding. Typical conditions are as follows:

| CONDITIONS | BROAD RANGE | OPTIMUM |
| --- | --- | --- |
| Temp. ° C | 175–280 | 215 |
| (° F) | (347–535) | (420) |
| Pressure Kg/cm$^2$ | 35.2–175.8 | 120 |
| (p.s.i.) | (500–2500) | (1700) |
| Cycle Time - sec. | 5–1800 | 60 |

As discussed later in greater detail, the molding composition is preferably formed into a preform. This preform may be preheated prior to being placed in the mold. Care is taken when preheating the preform to prevent any significant crosslinking prior to formation of the pile product in the mold.

Although the novel method lends itself to improved release of the pile product from the mold, it is desirable to either add a release agent to the molding composition or precoat the mold or the preform with a release agent. Release agents added to the molding composition may also facilitate blending of the ingredients during preparation of the preform. Examples of suitable release agents which may be added to the molding composition are fatty acids and their amides, esters and salts. Examples of suitable release agents for precoating the mold are silicone compounds and waxes.

A typical pile product made by the novel method would have fibers having an average diameter measured at the base ranging between 0.0087 and 0.05 centimeter (about 0.002 and 0.020 inch), an average length ranging between 0.01 and 5 centimeters (about 0.004 and 2.00 inch), and an aspect ratio (fiber length divided by fiber diameter) of greater than 1, preferably from 1 to 200. The fiber coverage density* normally ranges from 0.10 to 0.50, and the total surface area of the fibers is at least five, preferably more than 10, times greater than the surface area of the base. The cross section of the individual fibers may be, for example, circular, semi-circular, serrated or ribbed, hexagonal, octagonal, oval, triangular, rectangular, etc. The fibers may also be tapered or untapered.

*Fiber Coverage Density =

$$\frac{\text{(total volume of fibers)}}{\text{(area of the base)} \times \text{(average pile height)}}$$

Advantages

The advantages of our invention are manifold. First, the time to produce a molded pile product using the novel method is substantially less than that required using conventional molding processes. For example, a pile product having the above fiber characteristics can be molded using the novel method in about 1 minute or less. In contrast, to make a pile product of equivalent physical dimensions according to prior art processes would take in excess of 5 minutes. Our molding method, therefore, provides at least about a five-fold decrease in the molding cycle time.

The second advantage of the novel method is that the pile product is easily removed from the mold compared to prior art processes. As mentioned above, apparently, as crosslinking proceeds, gases are liberated which surround the fiber and form a barrier between the mold cavities and the fibers. This barrier tends to prevent the fibers from sticking to the wall of the cavities. Moreover, the gas pushes against the pile product, tending to force the pile product from the mold as soon as the applied molding pressure is removed. It has been observed that the molded pile product made according to our process may pop from the mold as soon as the molding pressure is released.

A third advantage is that the molded pile fibers may be stronger than the pile fibers produced using conventional methods. For example, ethylene vinyl acetate copolymer when molded using conventional methods provides a fiber which, when rubbed with a coin or other metal object, tends to elongate. Thus the surface of the pile product is disfigured if a coin is rubbed across it. In contrast, when ethylene vinyl acetate copolymer is crosslinked during molding of the fibers, such fibers resist entirely or will not be severely elongated by a coin rubbed against them.

A fourth advantage is that the mold or molded pile product cools only slightly during molding. Consequently, the mold design is simplified, and since the mold is not continuously cycled between extreme hot and cold temperatures, energy is conserved.

The pile product provided by the novel method may be specifically formulated to provide superior properties in selected performance areas. For example, pile products can be made having improved strength, resistance to solvents, high temperature stability, and/or flame retardancy.

EXAMPLES

In accordance with the preferred embodiment of the invention, a thin sheet of molding composition or preform is first prepared by blending together a crosslinkable polymeric material, a heat responsive crosslinking promoter, and other ingredients. Although the preform is preferred, pellets may also be used. The pile product is then molded from the preform or pellets.

The following examples disclose suitable molding compositions and the techniques for preparing the preform.

EXAMPLE 1

The preform of this example is prepared using the following ingredients:

| | PARTS |
|---|---|
| ethylenevinyl acetate copolymer (31% vinyl acetate, Melt Index 24.0,sp.gr. 0.960, sold by United States Industries, UE638) | 70 |
| low density polyethylene (Melt Index 3.3, sp.gr. 0.919, sold by United States Industries,NA 226) | 20 |
| butadiene polymer (sp.gr. 0.92, made by Polymer Inc.,Taktene 1220) | 10 |
| precipitated amorphous silica (.02 micron particle size, sold by PPG Industries, HiSil 233) | 35 |
| stearic acid | 0.5 |
| $\alpha,\alpha'$-bis-(t-butyl peroxy) diisopropylbenzene (39.5–41.5% active, supported on Burgess KE clay, sold by Hercules,Inc.,Vulcup 40KE) | 3.0 |

The polymeric material is softened and blended thoroughly with the silica and steric acid and then cooled to below 125° C (275° F) before the addition of the free radical generating peroxide. This mixing is carried out in a Farrel B Banbury mixer, but other intensive internal mixing equipment may be used. Following blending, the mixture is worked into sheet form, for example, by a two roll rubber mill to make the preform. The preform weight is 100 grams and its dimensions are about 6in. × 6in. × ⅛in. This preform is placed in a mold which is kept at the temperature of 420° F (215° C) and a pressure of about 1800 p.s.i. (122Kg/cm²) is applied at this point. The mold temperature drops about 15° F (8.3° C) momentarily. After about 1 minute at this temperature (420° F) and pressure (1800 p.s.i.), the pressure is released and the part is removed at this temperature.

EXAMPLE 2

The preform of this example is prepared using the following ingredients:

| | PARTS |
|---|---|
| low density polyethylene (Melt Index 2.0, sp.gr. 0.927, sold by United States Industries, NA 294) | 338 |
| styrene-butadiene block copolymer (sold by Shell Chemical Co., Kraton G, GXT 6500) | 422 |
| low density polyethylene (Melt Index 3.3, sp.gr. 0.919, sold by United States Industries, NA 226) | 421 |
| TiO₂ (anatase) | 2.0 |
| amorphous silica (0.040 micron particle size, sold by P.P.G. Industries, HiSil/EP) | 300 |
| stearic acid | 6.0 |
| trimethyol propane trimethacrylate (sold by Sartomer Co., Sr-350) | 4.0 |
| peroxide compound (Vulcup 40 KE) | 35 |

The above ingredients are blended together and made into a preform and molded as generally described in Example 1.

EXAMPLE 3

The preform of this example is prepared using the following ingredients:

| | PARTS |
|---|---|
| ethylene vinyl acetate copolymer (U. S. Industries, UE-638) | 70 |
| low density polyethylene (U.S. Industries, NA-226) | 20 |
| butadiene polymer (Polysar, Inc., Taktene-1220) | 10 |
| stearic acid | 0.5 |
| amorphous silica (P. P. G. Industries, HiSil 233) | 35 |
| trimethylol propane trimethacrylate (Sartomer Co., SR-350) | 2.0 |
| peroxide compound (Vulcup 40-KE) | 3.0 |

The above ingredients are blended together and made into a preform and molded as generally described in Example 1.

EXAMPLE 4

The preform of this example is prepared from the following ingredients:

| | PARTS |
|---|---|
| low density polyethylene (U. S. Industries, NA 294) | 338 |
| styrene-butadiene block copolymer (Shell Chemical Co., Kraton 1107) | 412 |
| polyethylene (U. S. Industries, NA 226) | 6 |
| silica (HiSil 233) | 300 |
| mold release agent (Humko Co., Kenamide E) | 0.9 |
| peroxide compound (Vulcup 40 KE) | |

The above ingredients are blended together and made into a preform and molded as generally described in Example 1.

EXAMPLE 5

The preform of this example is prepared using the following ingredients:

| | PARTS |
|---|---|
| ethylenevinyl acetate copolymer (31% vinyl acetate, Melt Index 24.0, SpGr. 0.960 sold by United States Industries, Division of National Distillers, Inc. NA638 | 70 |
| low density polyethylene (Melt Index 3.3, Sp.Gr. 0.919, sold by United States Industries, NA226) | 20 |
| butadiene polymer (SpGr. 0.92 made by Polysar, Inc., Taktene 1220) | 10 |
| stearic acid | 0.5 |
| α,α'- bis - (t-butyl peroxy) diisopropyl benzene (39.5 – 41.5% active, supported on Burgess KE clay, sold by Hercules, Inc., Vulcup 40 KE) | 3.0 |

A 6 × 6 × 1/10 inches preform was placed in a heated mold for preparing a molded pile product and a pressure of about 1800 p.s.i. (122 Kg/cm$^2$) was applied. The mold temperature was initially 200° F (93° C) and was raised to 400° F (204° C) in 4 minutes while under molding pressure, and held at 400° F (204° C) for 4 minutes. The part was essentially completely removed at 400° F (204° C).

EXAMPLE 6

The preform of this example is prepared using the following ingredients:

| | Parts |
|---|---|
| ethylene vinyl acetate copolymer (31% vinyl acetate, Melt Index 24.0, SpGr.0.960 sold by United States Industries, Division of National Distillers, Inc. NA638 | 70 |
| low density polyethylene (Melt Index 3.3, Sp.Gr.0.919, sold by United States Industries, NA226) | 20 |
| butadiene polymer (Sp.Gr. 0.92) made by Polysar, Inc.,Taktene 1220) | 10 |
| hydrated aluminum oxide, 65% Al$_2$O$_3$ (Aluminum Co. of America, Hydral C 330) | 35.0 |
| stearic acid | 0.5 |
| α,α'- bis - (t-butyl peroxy) diisopropyl benzene (39.5 – 41.5% active, supported on Burgess KE clay, sold by Hercules, Inc., Vulcup 40 KE) | 3.0 |

The sample can be molded using the similar molding procedure as is described in Example 5.

EXAMPLE 7

The preform of this example is prepared using the following ingredients:

| | PARTS |
|---|---|
| Chlorinated polyethylene (48% chlorine, Melt Viscosity 21.0, Sp.gr.1.25; sold by Dow Chemical Co. DOW CPE4814) | 100.0 |
| Epoxy Resin (sold by Shell Oil Co.Epon828) | 4.0 |
| Hydrated Alumina Oxide (Hydral C-330,Alcoa) | 40.0 |
| Modified Tribasic Lead Sulfate (NL Industries Tribase AG) | 4.0 |
| Basic Lead Soap Complex (NL Industries, Plastiflow PL1) | 0.5 |
| Distearylthiodipropionate (American Cyanamid Co. Plastanox STDP) | 1.0 |
| Tetraethylene glycol Dimethacrylate (Sartomer Resin Inc. SR-209) | 1.0 |
| α,α'-bis-(t-butyl peroxy) diisopropylbenzene (39.5 – 41.5% active, supported on Burgess KE clay, sold by Hercules Inc. Vulcup 40KE) | 2.5 |

The sample can be molded using the similar molding procedure as is described in Example 5.

EXAMPLE 8

The preform of this example is prepared using the following ingredients:

| | PARTS |
|---|---|
| Polyurethane Elastomer (sold by B.F. Goodrich Chemical Co. Estane 58109 specially mixed material for Brunswick Corporation in orange color) | 100.0 |
| Silica (HiSil 233 PPG Industries, Inc. | 15.0 |
| Ethylene glycol dimethacrylate (Sartomer Resin Inc. SR-206) | 4.0 |
| α, α'-bis-(t-butyl peroxy)diisopropyl benzene (39.5 – 41.5% active, supported on Burgess KE clay, sold by Hercules Inc. Vulcup 40KE) | 4.0 |

The sample can be molded using the similar molding procedure as is described in Example 5.

EXAMPLE 9

The preform of this example is prepared using the following ingredients:

| | PARTS |
|---|---|
| PVC compound (sold by B.F.Goodrich Co. Geon 8814) | 200.0 |
| Polyester elastomer (sold by E.I.DuPont Co. Hytrel 3495) | 100.0 |
| Tetraethylene glycol dimethacrylate (Sartomer Resin Inc. SR-209) | 5.0 |

| -continued | PARTS |
|---|---|
| Antimony Trioxide (25% active antimony oxide surface layer fused to a silica core, sold by N.L.Industries, Oncor 75RA) | 10.0 |
| α,α'-bis-(t-butyl peroxy) diisopropyl benzene (39.5 – 41.5% active, supported on Burgess KE clay, sold by Hercules Inc. Vulcup 40KE) | 6.0 |

The sample can be molded using the similar molding procedure as is described in Example 5.

THE DRAWINGS

The details of the novel method for making pile product and the pile product itself are schematically illustrated in the drawings, in which:

FIG. 1 is a schematic drawing in cross-section showing a preform in a mold.

FIG. 2 is a schematic drawing in cross-section showing the preform being forced into the mold.

FIG. 3 is a cross sectional view taken along line 3—3 of FIG. 1.

FIG. 4 is an enlarged elevational view of a fragment of one of the groove strips shown in FIG. 3.

FIG. 5 is an enlarged plan view showing one arrangement of the groove strips.

FIG. 6 is an enlarged plan view showing a second arrangement of the groove strips.

FIG. 7 is perspective view of the molded pile product of our invention.

FIG. 8 is a curve showing the relationship between the temperature at which the molded pile product is molded and the time the pile product is cured in the mold.

DETAILED DESCRIPTION OF THE DRAWINGS

FIGS. 1 and 2 illustrate in detail the method of the invention where a preform 10 prepared according to Example 1 is subjected to elevated pressure and temperature to form a molded pile product 12 (FIG. 7).

The mold 14 used to make the molded pile material 12 includes a frame 16 holding a number of parallel, tightly packed strips 18. These strips 18 are photoetched to form grooves 20 (FIG. 4). The strips 18, standing on their edges 22, are secured to the base 24 of the mold 14 by elongated I-bars 26 which slip into corresponding grooves 28 and 30, respectively, in the base 24 and the lower edges 22 of the grooved strips 18. Lateral movement of the strips is prevented by detachable sides 32. In assembling the mold 14, one of the sides 32 is detached and the strips 18 are stacked with their edges 22 resting on the base 24. Next the I-bars 26 are slipped into position. Lastly, the detached side 32 is secured as shown by fasteners 35.

The grooved strips 18 may be arranged in the mold frame 16 in two different ways. As shown in FIG. 5, the grooved strips 18 may be stacked on edge, side by side, so that the smooth surface 18a of one strip abuts the grooved surface 18b of an adjacent strip. Arranging the strips 18 in this manner provides cavities 18c having a generally D-shape cross-section.

The alternate way of arranging the grooved strips 18 is illustrated in FIG. 6. In this case, the grooved strips 18 are arranged in pairs with each strip in a pair having the grooved surfaces 18b abutting each other face to face. With this arrangement is used, cavities 18d having a generally circular or oval cross section are provided.

As illustrated in FIGS. 1 and 2, the grooved strip mold 14 has a companion ram 37 designed to fit closely within the high pressure molding area defined by the frame 16 and the tops of the grooved strips 18. The mold 14 and ram 37 are placed in a fast action hydraulic press and mounted in a retainer die set (not shown) which allows rapid and accurate compression of the preform 10. Both the mold 14 and the ram 37 are held at a controlled elevated temperature. In the present example, the mold and associated ram were held at 215° C (±2.8° C), 420° F (±5° F). However, molding temperature may momentarily drop up to 8° C.

The molded pile product 12 is prepared as follows: First the press (not shown) is opened and the preform of Example 1 is placed in the preheated mold 14 on top of the grooved stips 18 as shown in FIG. 1. The press is rapidly closed and a pressure of 128 Kg/cm$^2$ (1750 p.s.i.) is applied for about 1 minute.

As illustrated in FIG. 2, as the preform 10 melts, the molten composition is forced into the cavities 18c corresponding to the fibers 15 of the pile product 12. As the molding composition flows into the cavities 18c, its temperature is elevated above the decomposition temperature of the crosslinking promoter. Almost immediately, the free radicals are generated which initiate crosslinking of the polymeric material. Ordinarily, within from 1 to 120 seconds after the molding composition is heated, crosslinking of the polymeric material commences.

The preform 10 is retained in the mold and subjected to pressure for a dwell period of from about 20 to about 180 seconds, usually less than 2 minutes maximum. During this period the softened molding composition solidifies or gels due to the crosslinking of the polymeric material.

FIG. 8 illustrates the relationship between molding temperature and cure time. As depicted by the curve shown in FIG. 8, the higher the molding temperature, the shorter the cure time. In other words high temperatures favor rapid crosslinking, permitting early removal of the pile product from the mold.

To achieve release of the pile product 12 from the mold 14, the ram 37 is elevated and nitrogen is injected between the surface of the pile product and the grooved strips 18. About a 10.5 Kg/cm$^2$ (150 p.s.i.) nitrogen release pressure is suitable for a 6 × 6 inch preform 10. Preferably, the nitrogen flow is shut off before the ram 37 clears the frame 16. Release temperature is about 204° C (400° F).

Nitrogen is introduced into the mold 14 by means of an inlet 44 in the side of the mold. Because gas is ordinarily generated in situ during the crosslinking process, nitrogen release is not always necessary to achieve stripping of the fiber pile product 12 from the mold 14. In other words, the gases generated during the molding and crosslinking process create an internal pressure within the cavities or grooves 20 of the mold 14 which force the pile material 12 from the mold as soon as the ram 37 is elevated. To facilitate stripping, the surface of the mold 14, may be coated prior to the molding operation with a release agent such as a silicone resin e.g., Rezolin 8302 sold by Hexcel Corporation.

The molded pile product 12 prepared according to the novel method and using the above described mold 14 is schematically illustrated in FIG. 7. This pile product comprises a base 12 and plurality of fibers 15 extending from the base. The fibers 15 are characterized by being formed of a crosslinked polymeric material which was crosslinked during formation of the fibers. The fibers 15 may have many shapes depending upon the shapes of the cavities formed by the grooved strips 18. They may be tapered or nontapered. All the fibers may be of equal height, or some fibers may be longer than other fibers. The fibers may have different cross sectional configurations. The fibers may be parallel to each other or randomly oriented. Or the fibers may be of the same or different colors.

The pile product 12 is characterized by the physical dimensions of the fibers 15. The fibers 15 have an average diameter measured at the base ranging between 0.0087 and 0.5 centimeter (about 0.002 and 0.020 inch). The average length of the fibers ranges between 0.01 and 5 centimeter (about 0.004 and 2.00 inch) the aspect ratio of the fibers is greater than 1. The density of the fiber is from 0.10 to 0.50. Since the pile product 12 is formed by a molding process, the base 13 and the fibers 15 are integral. After crosslinking, the elastic modulus of the polymeric material forming the fibers should range between 15 and 15,000 $Kg/cm^2$.

In accordance with the preferred embodiment of the invention, the density, diameter and length of the fibers 15 are carefully selected so that the feel of the fibers to the touch is similar to the feel of conventional pile fabrics. This feel is achieved by adjusting the fiber length in the fiber diameter in accordance with the elastic modulus of the crosslinked material. The higher the modulus the thinner the diameter or longer the length of the fiber and vice versa.

It is claimed:

1. A method of compression molding a pile product whose fibers have an aspect ratio greater than 10 comprising the steps of:
    (a) subjecting a molding composition including a crosslinkable polymeric material to an elevated temperature and pressure to force the molding composition into a mold kept at the elevated temperature, the molding composition and crosslinkable material being selected so that the after crosslinking of the crosslinkable material the molding composition will have sufficient strength to remove the pile product from the mold at substantially said elevated temperature and the mold having a plurality of cavities corresponding to the fibers of the pile products; and
    (b) with the formation of the fibers according to step (a), initiating crosslinking of the polymeric material to give the molding composition sufficient strength to remove it from the mold at substantially said elevated temperature; and
    (c) removing the molded material from the mold at substantially said elevated temperature.

2. The method of claim 1 where the fibers being formed have an average diameter measured at the base ranging between 0.0087 and 0.05 centimeter, and an average length ranging between 0.01 and 5 centimeters, and a fiber coverage density of from 0.10 to 0.50.

3. The method of claim 2 where the temperature ranges between 175° and 280° C, and the pressure ranges between 35.2 and 175.8 kilograms per square centimeter.

4. The method of claim 3 where the molding cycle ranges between 5 and 1800 seconds.

5. The method of claim 4 where the molding composition includes from 10 to 99 weight percent cross-linkable polymeric material, from 0.05 to 5 weight percent of a substance which promotes crosslinking of said material-heating, and from 0 to 70 weight percent of a polymerizable monomer.

6. The method of claim 5 where cross-linkable polymeric material comprises a polymer, copolymer or mixtures thereof derived from polymerizable organic compounds selected from the group consisting of:
    (a) olefin hydrocarbons,
    (b) vinyl compounds,
    (c) diene compounds,
    (d) esters, and
    (e) urethanes.

7. The method of claim 5 where the major component of the cross-linkable polymeric material is ethylene vinyl acetate copolymer.

8. The method of claim 5 where the crosslinkable polymeric material is selected to be crosslinked by the substance which promotes crosslinking and said substance is selected from the group consisting of:
    a. a peroxide compound,
    b. a mixture of a peroxide compound, a silicon compound and a catalyst.
    c. an azo compound, and
    d. a mixture of zinc oxide and sulfur.

* * * * *